(12) United States Patent
Egami

(10) Patent No.: US 6,729,998 B2
(45) Date of Patent: May 4, 2004

(54) FUNCTIONAL COMBINED EQUIPMENT FOR MOTOR VEHICLE

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 10/285,584

(22) Filed: Nov. 1, 2002

(65) Prior Publication Data

US 2003/0097848 A1 May 29, 2003

(30) Foreign Application Priority Data

Nov. 28, 2001 (JP) ......................................... 2001-363036

(51) Int. Cl.[7] .............................. B60H 1/32; F25B 27/00
(52) U.S. Cl. .............................. 477/3; 62/323.3; 62/133; 180/53.8
(58) Field of Search ............................ 477/3; 180/53.8; 62/323.3, 323.4, 133; 123/179.4, 198 R (56) References Cited

U.S. PATENT DOCUMENTS 5,896,750 A    4/1999   Karl
6,401,012 B1 * 6/2002   Aoki et al. .................... 701/1

FOREIGN PATENT DOCUMENTS

| EP | 0645271 A2 | 3/1995 |
|----|-----------|--------|
| EP | 0916546 A2 | 9/1998 |
| EP | 0930185 A1 | 7/1999 |
| EP | 1249360 A1 | 10/2002 |
| JP | 2000-229516 | 8/2000 |

OTHER PUBLICATIONS

Patent Abstracts of Japan, vol. 2000, No. 22, Mar. 9, 2001 & JP 2001 128308 A (Denso Corp.), May 11, 2001.
Egami et al; US SN 10/101,610; Filed Mar. 21, 2002; "Accessory Equipment Driving Device for Vehicle".
Egami; US SN 10/175,100; Filed Jun. 20, 2002; "Title of the Invention a Functional Combined Equipment for a Motor Vehicle Background of the Invention".

* cited by examiner

Primary Examiner—Ankur Parekh
(74) Attorney, Agent, or Firm—Nixon & Vanderhye P.C.

(57) ABSTRACT

A shaft of a planetary gear mechanism is connected via a lock mechanism to an air-conditioner compressor. A shaft is connected to an engine, and a shaft is connected to a motor-generator. The shaft or the shaft of the motor-generator is linked to the shaft through a clutch mechanism. A control unit reduces shock by changing the rotation speed of the motor-generator on the basis of the engine speed and reducing a speed difference between the input shafts of the clutch mechanism and a speed difference between the input shafts of the lock mechanism before engaging of the clutch mechanism and releasing of the lock mechanism.

9 Claims, 7 Drawing Sheets

|  | S | M | GC | G |
|---|---|---|---|---|
| MODE | STARTER | ELECTRIC A/C | NORMAL (A/C & ALT) | NORMAL (ALT) |
| ENGINE | STOP | STOP | RUN | RUN |
| CLUTCH | OFF | ON | ON | OFF |
| LOCK | ON | OFF | OFF | ON |

FUNCTIONAL COMBINED EQUIPMENT FOR MOTOR VEHICLE

CROSS REFERENCE TO RELATED APPLICATION

This application is based on and incorporates herein by reference Japanese Patent Application No. 2001-363036 filed Nov. 28, 2001.

FIELD OF THE INVENTION

This invention relates to a functional combined equipment for a motor vehicle, and particularly to an apparatus which has an idle-stop function and makes an air-conditioner compressor electrically driveable.

BACKGROUND OF THE INVENTION

As automobile fuel consumption improvement technology, an idle-stop vehicle having an idle-stop function for fuel consumption improvement through engine stops at idling times is proposed. In this vehicle, an air-conditioner compressor is driven by the engine. When the engine stops at an idling time, the air-conditioner does not function. When the air-conditioner operation is required, air-conditioner operation is secured by cancelling the idle-stop function. Consequently, a fuel consumption improvement effect of the idle-stop is not attained.

As a solution to this problem, a hybrid compressor is proposed in JP-A-2000-229516. In this case, a motor is integrated with a compressor. When the engine runs, the compressor is driven by the engine. When the engine is stopped, the compressor is driven by the motor. It is thus possible to establish both idle-stop and air-conditioner functions in an idle-stopping vehicle. However, a starter for starting the engine and an alternator for supplying power to electrical loads of the vehicle are necessary.

There are as many as two electric motors, and two inverters for driving them may also be necessary. Thus the system becomes expensive. As a solution to this problem, U.S. Pat. No. 5,896,750 proposes a motor-generator-type functional combined equipment for motor vehicle, wherein a single motor-generator (motor-generator) is made to serve as an engine starter and an alternator. This motor-generator (MG) and a compressor are connected by a belt via a one-way clutch from the engine. The engine starter function, the alternator function and the compressor-driving function are realized by this single motor-generator. However, because a one-way clutch is mounted on the crank pulley side of the engine, the overall length of the engine becomes long and mounting in FF-vehicles is difficult.

A torque distribution-type technology is proposed for the motor-generator-type functional combined equipment for a motor vehicle. In this apparatus, an engine, a compressor and a motor-generator are connected by a special torque distribution mechanism, which distributes torque among these machines in an optimal distribution ratio.

However, when the states of a lock mechanism and a clutch mechanism are simply changed when a compressor rotation requirement or stop requirement arises during engine operation, the speed reduction ratio from the motor-generator to the engine changes suddenly. Therefore, vibration noise or vehicle travel torque shock occurs.

SUMMARY OF THE INVENTION

It is therefore an object of the present invention to improve a functional combined equipment for motor vehicle by using a single motor-generator but not using a one-way clutch on a crank pulley of an engine.

According to the present invention, in conducting torque transfer among an engine, a motor-generator and an accessory device by means of a three-shaft torque-dividing mechanism such as a planetary gear mechanism, a lock mechanism is provided on the shaft of the torque-dividing mechanism for driving the accessory device. The shaft for driving the accessory device and the shaft of the torque-dividing mechanism for driving the motor-generator side are connected by way of a clutch mechanism. Also, shock caused by a state change of the clutch mechanism or the lock mechanism is moderated by the motor-generator being driven before the state change of the clutch mechanism or the lock mechanism. It is thus possible to deter the speeds of the shafts of the torque-dividing mechanism from suddenly changing and shock and noise consequently increasing due to state changes of the clutch mechanism and the lock mechanism.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
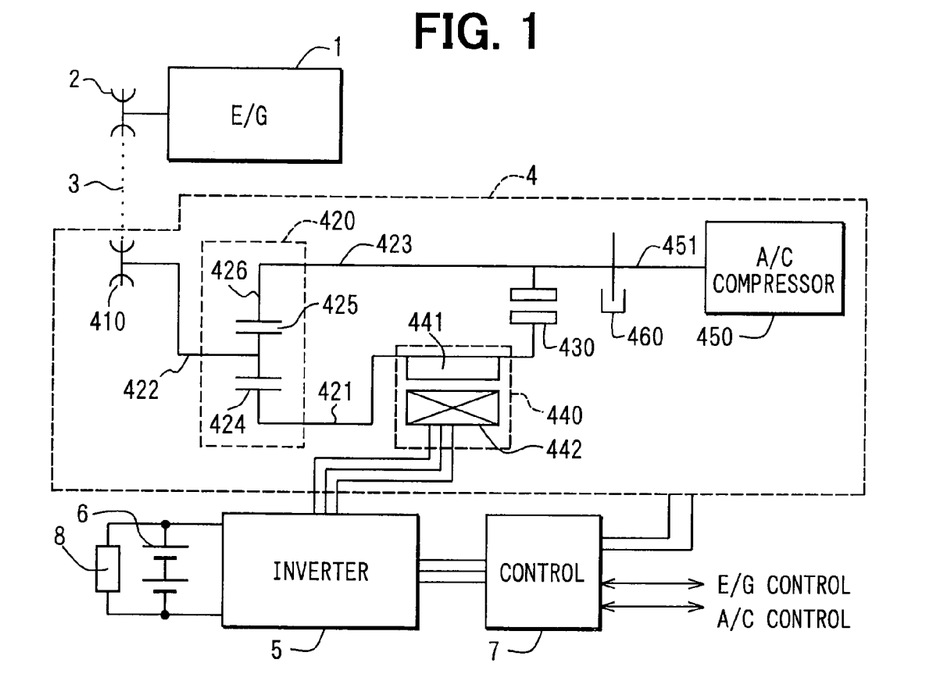
FIG. 1 is a block diagram showing a functional combined equipment for motor vehicle according to an embodiment of the present invention.
Figure 2:
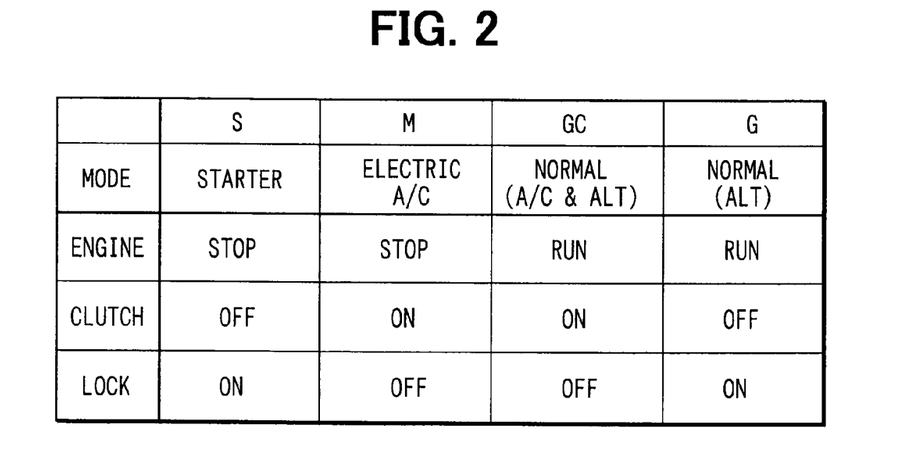
FIG. 2 is a table showing operating modes of the apparatus.

A functional combined equipment for a motor vehicles is shown in FIG. 1. In FIG. 1, numeral 1 is an internal combustion engine (E/G) which is stopped at idling times, and 2 is a crank pulley. Numeral 3 is a belt for transmitting motive power of the internal combustion engine 1 through the crank pulley 2 to outside. Numeral 4 is an accessory device. Numeral 5 is an inverter, which converts inputted d.c. electrical power into a.c. electrical power for driving the accessory device 4. Numeral 6 is a battery. Numeral 7 is an electronic control unit with a built-in microcomputer, which, on the basis of information from an internal combustion engine control unit and an air-conditioner control unit and so on (not shown), selects one of a starter mode, an electric compressor mode, a normal mode or an engine-driven compressor mode. In correspondence with the selected mode, the control unit 7 carries out control of the inverter 5 and engaging (ON) or disengaging (OFF) operation of a clutch mechanism, and control of locking (ON) or unlocking (OFF) operation of a lock mechanism. Numeral 8 is electrical loads of a vehicle.

In the accessory device 4, numeral 410 is an input pulley, about which the belt 3 passes and upon which motive power of the internal combustion engine 1 can act. Numeral 420 is a torque-dividing mechanism, which has a first shaft 421, a second shaft 422, a third shaft 423, and a known planetary gear device including a ring gear 424, a carrier 425 and a sun gear 426. Numeral 430 is a clutch mechanism which, by engaging or disengaging, can select whether the first shaft 421 and the third shaft 423 of the torque-dividing mechanism 420 are made to rotate together or are made to rotate individually. This clutch mechanism 430 is constructed as one of electromagnetic type or hydraulic type.

Numeral 440 is a motor-generator (MG), which has a rotor 441 and a stator 442. The rotor 441 is connected to the first shaft 421 of the torque-dividing mechanism 420. The stator 442 is mechanically fixed to the internal combustion engine 1, and electrically connected to the inverter 5. For example, at times of electric drive, electrical power is supplied to the motor-generator 440 via the inverter 5 from the storage battery 6, and the rotor 441 generates a torque.

Numeral 450 is a compressor for a vehicle air-conditioner (A/C), which compresses coolant while being rotated by the input shaft 451 and expels the coolant. Its input shaft 451 is connected to the third shaft 423 of the torque-dividing mechanism 420. Numeral 460 is a lock mechanism such as a brake mechanism for controlling rotation of the third shaft 423 of the torque-dividing mechanism 420.

The above apparatus operates as follows. When the vehicle is stopped for a traffic signal wait, the internal combustion engine 1 is stopped by the idle-stop control. When in this state the vehicle is required to start moving again, a starter mode (S mode) for starting the internal combustion engine 1 is implemented.

In this starter mode, by the clutch mechanism 430 being in the disengaging condition (OFF: released) and the lock mechanism 460 being in the locking condition (ON), rotation of the third shaft 423 of the torque-dividing mechanism 420 is in the locking condition, and the rotor 441 of the motor-generator 440 becomes mechanically connected to the input pulley 410 via the ring gear 424 and the carrier 425. The control unit 7 drives the inverter 5 and thereby supplies a.c. power to the motor-generator 440 so that the motor-generator 440 generates a torque necessary for starting the internal combustion engine 1.

While the internal combustion engine 1 is stopped, there is a requirement for the compressor 450 for operating the air-conditioner. Because the internal combustion engine 1 is stopped, an electric air-conditioner compressor mode (M mode) is implemented to operate the motor-generator 440 to drive the compressor 450.

In this electric compressor mode, the clutch mechanism 430 is in the disengaging condition (OFF) and the lock mechanism 460 is in the unlocking condition (OFF). Because the second shaft 422 of the torque-dividing mechanism 420 is restrained by friction of the internal combustion engine 1, the rotor 441 of the motor-generator 440 becomes mechanically connected to the compressor 450 by way of the ring gear 424 and the sun gear 426. At this time, the control unit 7 drives the inverter 5 and thereby supplies the a.c. power to the motor-generator 440 so that the motor-generator 440 generates a torque necessary for rotating the compressor 450.

When the internal combustion engine 1 is operated to run and the motor-generator 440 is made to generate electricity as a normal alternator (ALT) to supply power to the electrical loads 8 of the vehicle and simultaneously the air-conditioner (A/C) is operated with the internal combustion engine 1, the first normal mode (GC mode) is implemented.

In the first normal mode (GC mode), the clutch mechanism 430 is in the engaging condition (ON), the lock mechanism 460 is in the unlocking condition (OFF), so that the first shaft 421 and the third shaft 423 of the torque-dividing mechanism 420 are rotated integrally. That is, the torque inputted to the second shaft 422 of the torque-dividing mechanism 420 from the internal combustion engine 1 is divided between the motor-generator 440 and the compressor 450.

When the internal combustion engine 1 is running, to supply power to the electrical loads 8 of the vehicle the motor-generator 440 is made to generate electricity as an ordinary alternator. When the air-conditioner is not to be operated by the internal combustion engine 1, the second normal mode (G mode) is implemented. The first normal mode (GC mode) and the second normal mode (G mode) will also simply be called the normal mode. In the second normal mode (G mode), when the compressor 450 is stopped by a demand from the air-conditioner control unit while the engine 1 is running, the clutch mechanism 430 is in the engaging condition (OFF) and the lock mechanism 460 is in the locking condition (ON).

The control unit 7 controls the accessory device 4 as above by executing processing shown in FIG. 3 through FIG. 9.

Figure 3:
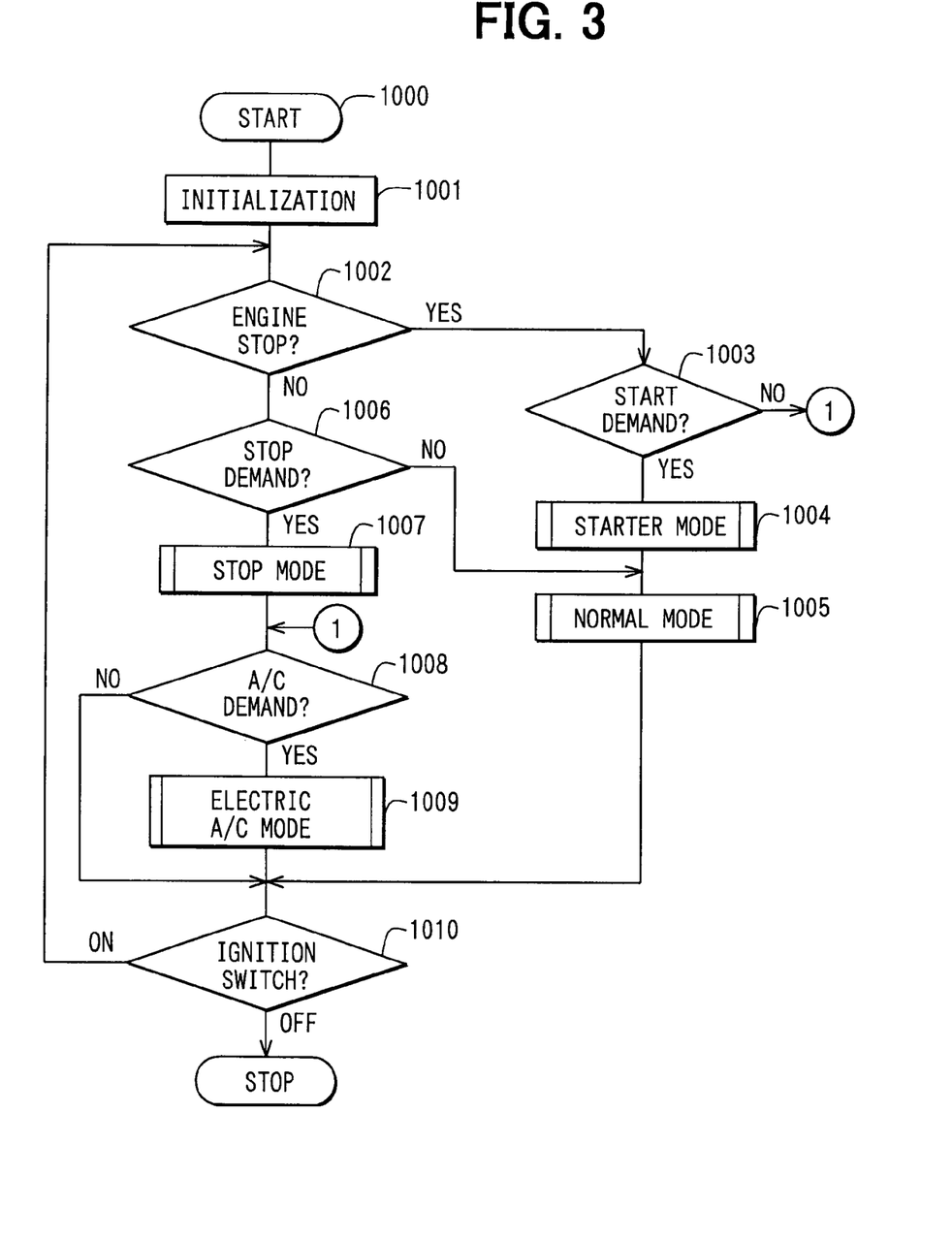
FIG. 3 is a flow chart showing a main routine executed by the apparatus.

In a main routine shown in FIG. 3, the processing routine is started by an ignition switch being turned on. After resetting and initialization are carried out in step 1001, it is checked whether the engine 1 is stopped (step 1002). If it is stopped, it is checked whether an engine start demand is received from the internal combustion engine control unit (step 1003). If there is no engine start demand, processing jumps to step 1008. If there is an engine start demand, the starter mode (S mode) is implemented (step 1004), the first normal mode 1005 is implemented, and processing proceeds to step 1010. If the engine is operating in step 1002, processing proceeds to step 1006.

In step 1006, it is checked whether there is an engine stop demand. If there is not, then processing proceeds to step 1005 and implements the normal mode. If there is an engine stop demand, processing proceeds to step 1007 and implements a stop mode to stop the engine. Also, it is checked whether an air-conditioner demand, that is, a demand for operation of the compressor 450, is received from the air-conditioner control unit (step 1008). If not, then processing jumps to step 1010. If there is an electric air-conditioner demand, an electric air-conditioner mode (electric compressor mode) is executed (step 1009), and processing proceeds to step 1010. In step 1010, it is checked whether the ignition switch is ON. If it is ON, then processing returns to step 1002. If it is OFF, then this main routine ends.

Details of the modes S, M, G, GC will be explained below with reference to the flow charts shown in FIG. 4 through FIG. 8.

Figure 4:
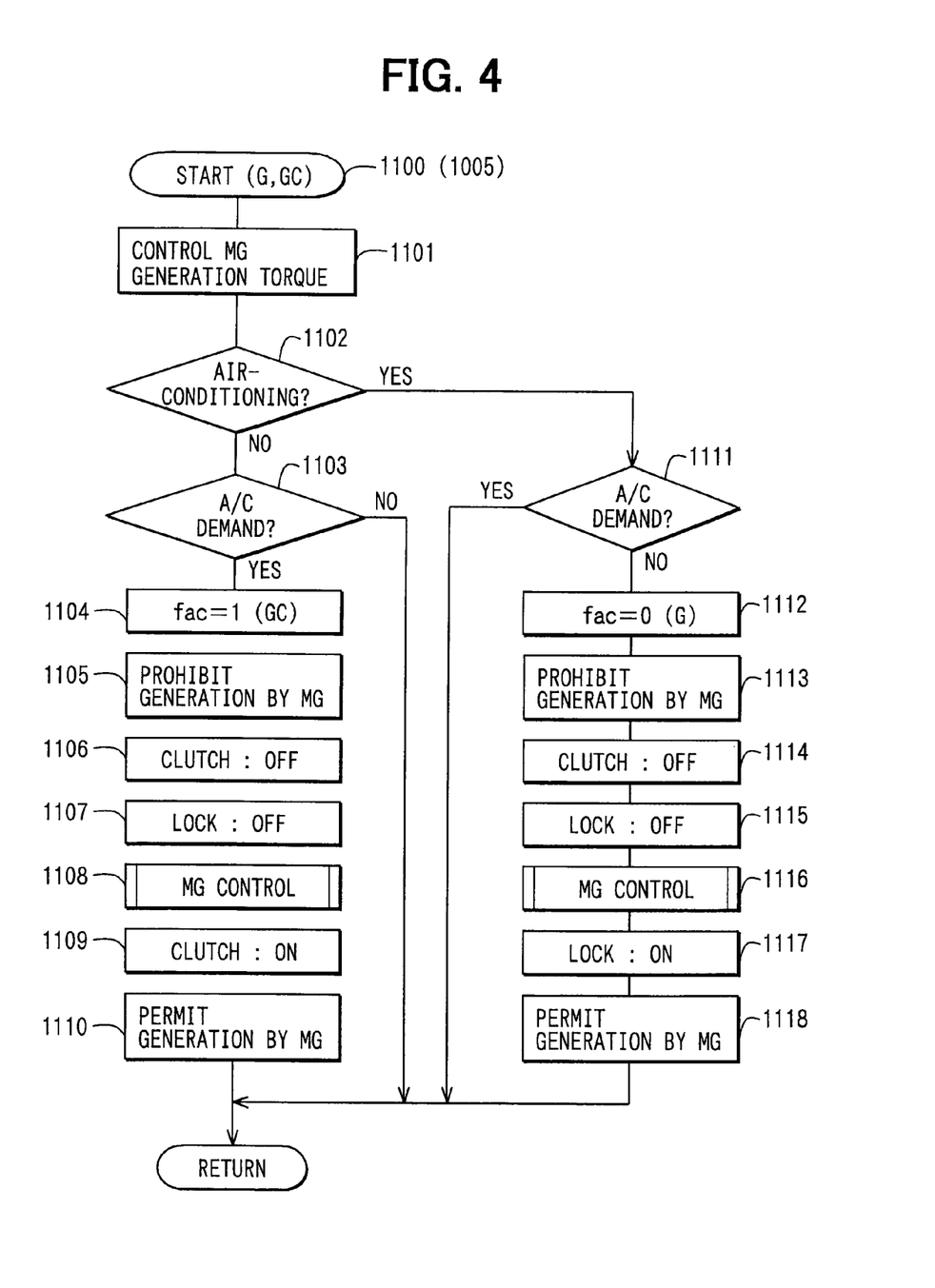
FIG. 4 is a flow chart showing a normal mode routine executed by the apparatus.

(Normal Mode Routine 1100 for Modes G, GC)

In FIG. 4, in correspondence with a generation demand value the generation torque of the motor-generator 440, which is a synchronous machine, is controlled (step 1101). It is checked whether the air-conditioner compressor 450 is operating (step 1102) for air-conditioning. If the compressor 450 is not operating, it is checked whether operation of the compressor 450 is demanded (step 1103). If it is not demanded, then processing returns to the main routine of the control unit 7.

If it is demanded, then a flag fac is set to 1 (step 1104), which indicates the GC mode. In this case, power generation by the motor-generator 440 is prohibited (step 1105), and the clutch mechanism 430 and the lock mechanism 460 are in the disengaging condition and in the unlocking condition (steps 1106, 1107), respectively. The motor-generator 440 is controlled (step 1108), the clutch mechanism 430 is in the engaging condition (step 1109), and generation by the motor-generator 440 is permitted (step 1110).

The generation prohibition of the motor-generator 440 carried out in step 1105 is for reducing the load torque on the first shaft 421 of the torque-dividing mechanism 420 to smooth speed changes thereof occurring on releasing of the clutch mechanism 430 and the lock mechanism 460 carried out in the subsequent steps 1106 and 1107. The disengaging and unlocking of the clutch mechanism 430 and the lock mechanism 460 carried out in steps 1106, 1107 is for facilitating speed changes of the shafts resulting from the motor-generator control carried out in step 1108. The motor-generator control carried out in step 1108 is mainly for reducing the shock on the engagement of the clutch mechanism 430 carried out in step 1109.

The control of the motor-generator 440 carried out in step 1108 is implemented as follows. First, a target speed of the motor-generator 440 is calculated on the basis of the speed of the first shaft 421 and the state of the torque-dividing mechanism 420 (for example the speeds of the gears), current to the motor-generator 440 is controlled to attain this target speed. When the motor-generator approximately reaches the target speed, the clutch mechanism 430 and the lock mechanism 460 are set to predetermined states, whereby a sudden change in the engine speed is prevented and vibration noise and travel torque shock are prevented.

In this control, a difference between the speed of the third shaft 423, which can be determined from the engine speed or the like and the speed of the motor-generator 440, i.e., the speed of the first shaft 421, which can be detected by a speed sensor (not shown) or from a generated electricity voltage frequency or the like, is obtained. The target speed of the motor-generator 440 is set so that this difference becomes 0. The motor-generator 440 is controlled so that the motor-generator 440 reaches this target speed, and the clutch mechanism 430 is in the engaging condition (ON) after that. As a result, there is almost no occurrence of engagement shock of the clutch mechanism 430. After engagement, the motor-generator 440 performs the required electricity generation.

Because power generation prohibition of the motor-generator 440 is carried out in step 1105, the subsequent speed changes of the first shaft 421 caused by releasing of the clutch mechanism 430 and the lock mechanism 460 (steps 1106, 1107) become possible, and the shock on operating state changes of this torque-dividing mechanism 420 is small.

When the lock mechanism 460 is in the unlocking condition (OFF), the engine 1 exerts a torque on the compressor 450 through the torque-dividing mechanism 420 and the load torque on the engine 1 increases. However, because load torque reduction of the engine 1 resulting from power generation by the motor-generator 440 is prohibited immediately before that arises, the load torque fluctuation of the engine at this time is reduced as a whole.

Next, if the compressor 450 is not operating instep 1102, it is checked whether operation of the compressor 450 is demanded (step 1111). If it is demanded, then processing returns to the main routine shown in FIG. 3. If it is not demanded, the flag fac is set to 0 (step 1112), which indicates the G mode. In this control, generation by the motor-generator 440 is prohibited (step 1113), the clutch mechanism 430 and the lock mechanism 460 are in the engaging condition and in the unlocking condition (steps 1114, 1115), respectively, the motor-generator 440 is controlled (step 1116), the lock mechanism 460 is in the locking condition (step 1117), and generation of the motor-generator 440 is permitted (step 1118).

The control and generation prohibition of the motor-generator 440 carried out in step 1113 are essentially the same as that carried out in the step 1105. The releasing (OFF) of the clutch mechanism 430 and the lock mechanism 460 carried out in steps 1114, 1115 is essentially the same as that carried out in steps 1106, 1107.

The control of the motor-generator 440 carried out in step 1116 is carried out as follows. First, a target speed of the motor-generator 440 is calculated on the basis of the speed of the first shaft 421 and the state of the torque-dividing mechanism 420 (for example the speeds of the gears), and the current to the motor-generator 440 is controlled to obtain this target speed. When the motor-generator 440 approximately reaches the target speed, the clutch mechanism 430 and the lock mechanism 460 are set to predetermined states, whereby a sudden change in the engine speed is prevented and vibration noise and travel torque shock are prevented.

In practice, a difference between the speed of the third shaft 423, which can be determined from the engine speed or the like, and the speed of the motor-generator 440, i.e., the speed of the first shaft 421, which can be detected by a speed sensor (not shown) or from a generated electricity voltage frequency or the like, is obtained. A target speed of the motor-generator 440 is set so that this difference becomes the speed of the first shaft 421 (in other words, so that the speed of the third shaft 423 becomes 0), the motor-generator 440 is controlled so that the motor-generator 440 reaches this target speed, and the lock mechanism 460 is in the locking condition (ON) after that. As a result, there is almost no occurrence of engagement shock of the lock mechanism 460. After locking, the motor-generator 440 performs the required electricity generation.

It will be understood that, in the normal mode, prohibiting power generation (current flow) of the motor-generator 440 before releasing of the clutch mechanism 430 and the lock mechanism 460 can realize response improvement and shock reducing of state changes of the torque-dividing mechanism 420 resulting from releasing of the clutch mechanism 430 and the lock mechanism 460, and reducing of engagement and locking shock resulting from the speed of the motor-generator 440 being brought to the speed of the first shaft 421 or the compressor 450 before engaging of the clutch mechanism 430 or locking of the lock mechanism 460.

Figure 5:
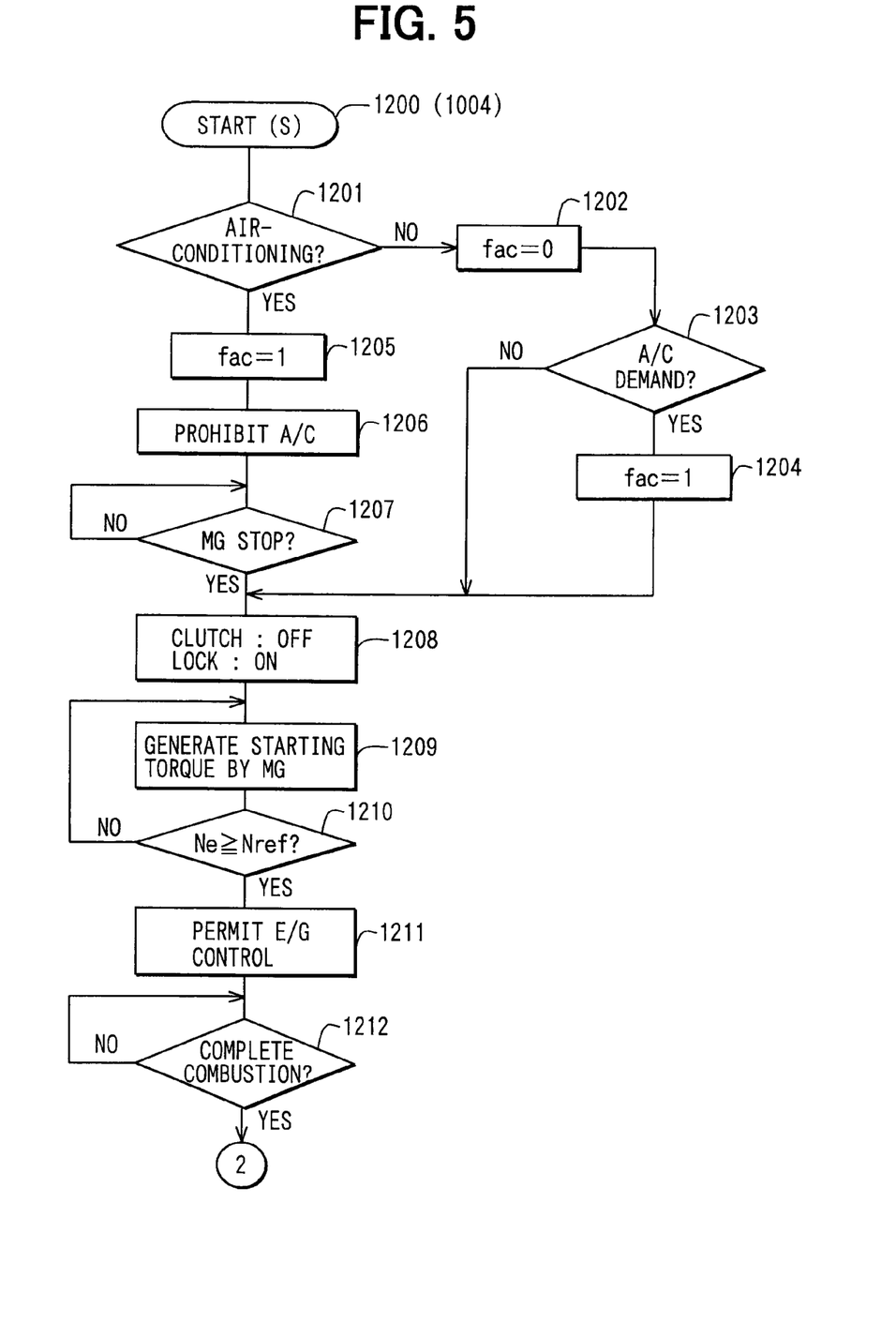
FIG. 5 is a flow chart showing a part of a starter mode routine executed by the apparatus.
Figure 6:
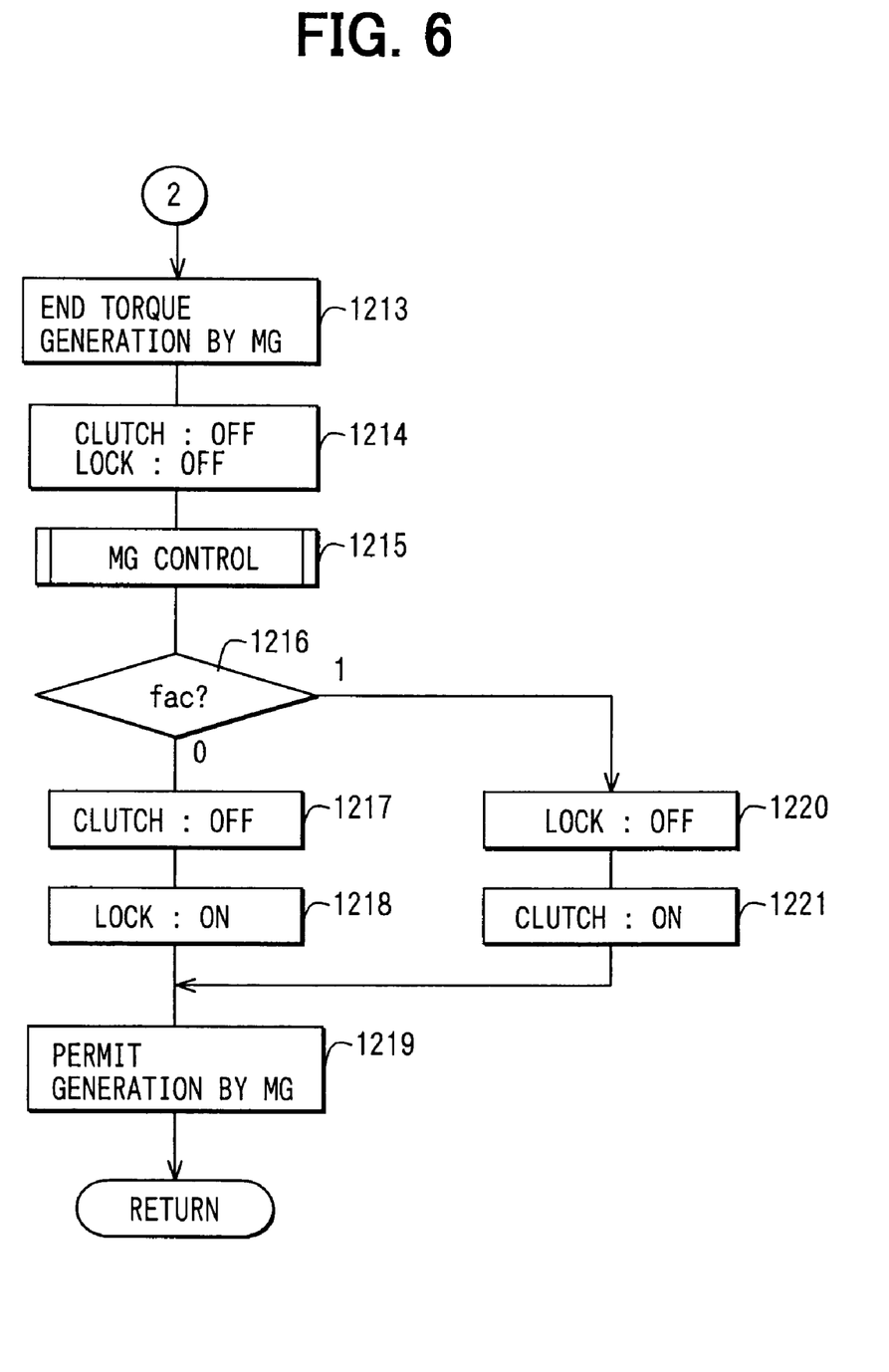
FIG. 6 is a flow chart showing a remainder of the starter mode routine executed by the apparatus.

(Starter Mode Routine 1200 for Mode S)

In the starter mode routine 1200, which is shown in FIGS. 5 and 6, it is checked whether the air-conditioner compressor 450 is operating (step 1201). If the air-conditioner compressor 450 is stopped, the flag fac is set to 0 (step 1202). It is checked whether there is still a demand for operation of the air-conditioner compressor 450 (step 1203). Only when there is a demand, the flag fac is restored to 1 (step 1204) and processing proceeds to step 1208.

If the air-conditioner compressor 450 is operating in step 1201, the flag fac is set to 1 (step 1205), operation of the air-conditioner compressor 450 is prohibited (step 1206), stopping of the motor-generator 440 is awaited (step 1207), the clutch mechanism 430 is in the disengaging condition (OFF), the lock mechanism 460 is in the locking condition (ON) at step 1208, and processing proceeds to step 1209.

The operation prohibition of the air-conditioner compressor 450 referred to in step 1206, because the engine is stopped, means operation prohibition of the air-conditioner compressor 450 in the electric compressor mode, i.e., prohibition of driving of the air-conditioner compressor 450 effected by cutting off current flow to the motor-generator 440. That is, in the above control, if the apparatus is in the electric compressor mode M on starting of the engine 1, stopping of the motor-generator 440 is awaited before locking of the lock mechanism 460 is carried out. Consequently shock from this locking does not arise.

In step 1209, the motor-generator 440 is caused to generate an engine starting torque, processing waits for the engine speed Ne to reach a predetermined reference value Nref (step 1210). The internal combustion engine control unit is permitted to start engine combustion control (step 1211). In step 1209, because the third shaft 423 of the torque-dividing mechanism 420 is in the locking condition, the motor-generator 440 is all transmitted to the engine 1 through the first shaft 421 and the second shaft 422 of the torque-dividing mechanism 420 so that the engine 1 is started.

After that, complete combustion confirmation of the engine 1 is awaited by a method such as determining whether the engine speed reaches a higher predetermined reference value (step 1212), starting torque generation of the motor-generator 440 is caused to end (step 1213), and control of the motor-generator 440 is carried out (step 1215).

The control of the motor-generator 440 in step 1215 is essentially the same as the control of the motor-generator 440 in steps 1108 and 1116. That is, the flag fac is checked. If the flag fac is 1, the same control as step 1108 is carried out. If the flag fac is 0, the same control as step 1116 is carried out. By this means, shock in subsequent engagement of the clutch mechanism 430 (step 1221) and locking of the lock mechanism 460 (step 1218) can be reduced.

Next, processing proceeds to step 1216 and checks the flag fac. If the flag fac is 0, then disengaging (OFF) of the clutch mechanism 430 (step 1217) and locking (ON) of the lock mechanism 460 (step 1218) are carried out, power generation by the motor-generator 440 is permitted and processing returns to the main routine (step 1219).

If the flag fac is 1 in step 1216, unlocking (OFF) of the lock mechanism 460 (step 1220) and engaging (ON) of the clutch mechanism 430 (step 1221) are carried out, and then processing proceeds to step 1219. The above steps 1217, 1218 are essentially the same as steps 1114, 1117. The steps 1220, 1221 are essentially the same as steps 1107, 1109.

Accordingly, also in state changes of the clutch mechanism 430 and the lock mechanism 460 in the starter mode S, reducing of the shock thereof can be realized by control of the motor-generator 440 before that. Because the clutch mechanism 430 and the lock mechanism 460 are released before this control of the motor-generator 440, speed changing of the motor-generator 440 becomes smooth.

Figure 7:
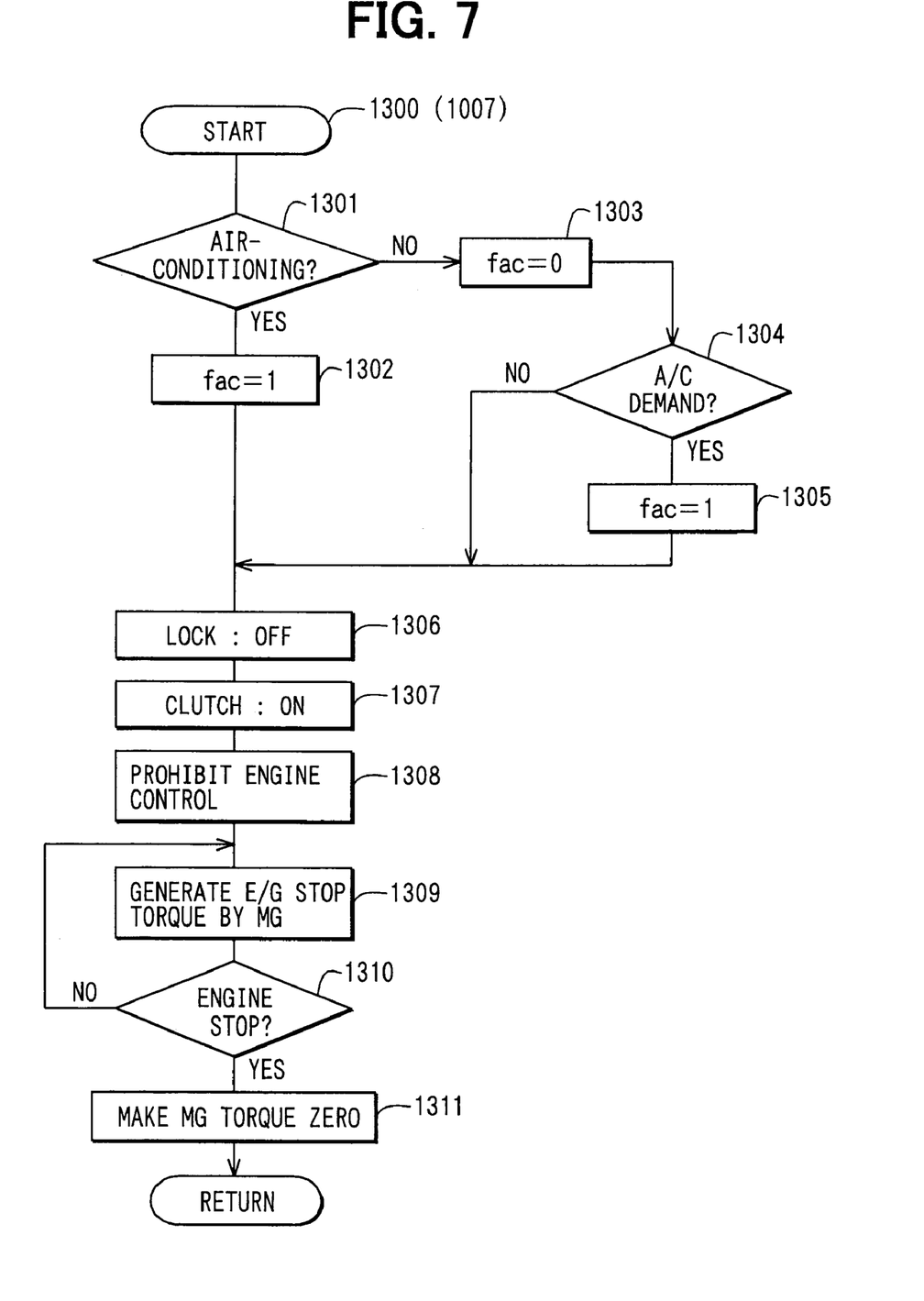
FIG. 7 is a flow chart showing a stopping mode routine executed by the apparatus.

(Stop Mode Routine 1300)

In the stop mode 1300 shown in FIG. 7, it is checked whether the air-conditioner compressor 450 is operating, i.e., air-conditioning (step 1301). If the air-conditioner compressor 450 is operating, the flag fac is set to 1 (step 1302) and processing proceeds to step 1306. If in step 1301 the air-conditioner compressor 450 is not operating, the flag fac is set to 0 (step 1303). Only when there is still a demand for operation of the air-conditioner compressor 450, the flag fac is set to 1 (step 1305) and processing proceeds to step 1306.

In step 1306, the lock mechanism 460 is in the unlocking condition (OFF). Then the clutch mechanism 430 is in the engaging condition (step 1307), prohibition of engine combustion control by the internal combustion engine control unit is demanded (step 1308), the motor-generator 440 is made to generate an engine stopping torque (step 1309), stopping of the engine is confirmed (step 1310), and processing proceeds to step 1311.

Steps 1306 and 1307 are for absorbing the engine stopping torque with the air-conditioner compressor 450. To reduce shock caused by the releasing of the lock mechanism 460 and the engagement of the clutch mechanism 430 in these steps 1306 and 1307, of course, generation by the motor-generator 440 may be prohibited before the releasing of the lock mechanism 460, as in step 1105, or control of the motor-generator 440 may be carried out before the engagement of the clutch mechanism 430, as described in step 1108.

When the stopping torque of the motor-generator 440 is made 0 in step 1311, processing returns to the main routine shown in FIG. 3 and checks the flag fac (step 1008). If it is 0, processing detours to step 1010. If it is 1, the electric compressor mode M is implemented (step 1009).

Figure 8:
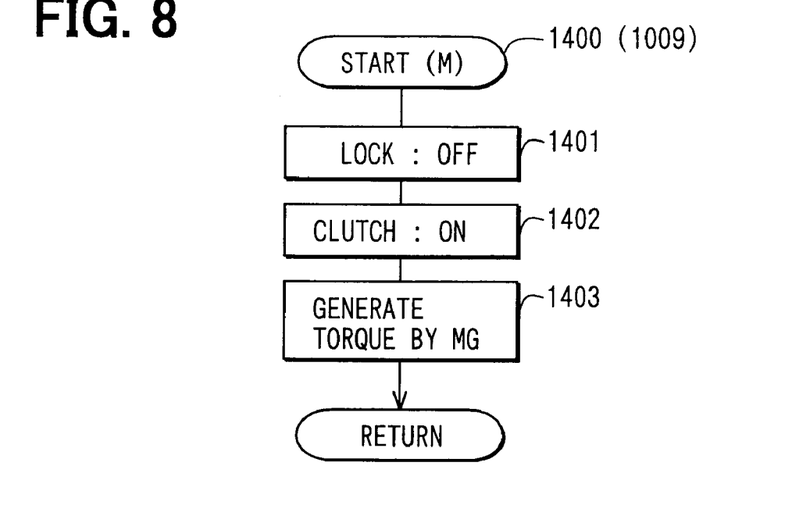
FIG. 8 is a flow chart showing an electric compressor mode routine executed by the apparatus.

(Electric Compressor Mode Routine 1400 for Mode M)

The electric compressor mode (electric compressor mode routine) M is shown in FIG. 8. First, the lock mechanism 460 is in the unlocking condition (step 1401), the clutch mechanism 430 is in the engaging condition (step 1402), and the motor-generator 440 is made to generate an electromotive torque corresponding to a demand from the air-conditioner control unit (step 1403).

To reduce shock caused by the disengaging of the lock mechanism 460 and the engagement of the clutch mechanism 430 in these steps 1401 and 1402, generation by the motor-generator 440 may be prohibited before the releasing of the lock mechanism 460, as in step 1105, or control of the motor-generator 440 may be carried out before the engagement of the clutch mechanism 430, as described in step 1108.

Also, this electric compressor mode M is first carried out at first at least after the stopping mode 1007 in the main routine shown in FIG. 3 (the stopping mode routine 1300 shown in FIG. 7). Because in this stopping mode routine 1300 releasing of the lock mechanism 460 and engagement of the clutch mechanism 430 are carried out in steps 1306 and 1307, the steps 1401, 1402 in the electric compressor mode M can be omitted.

Figure 9:
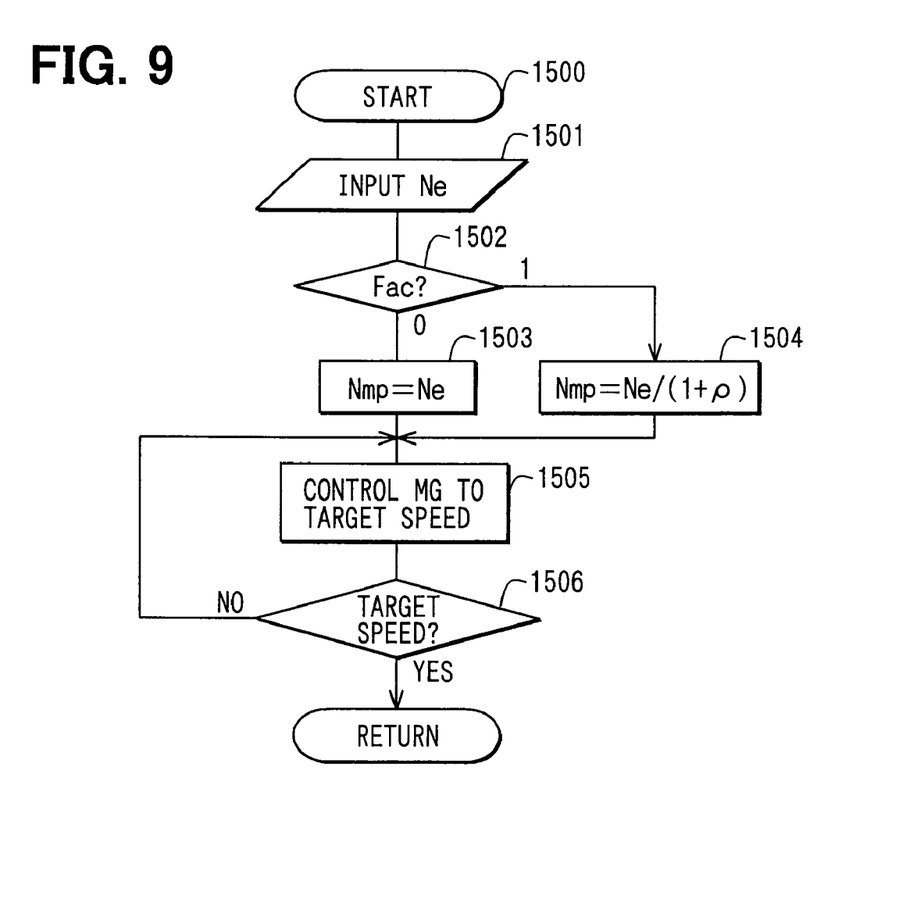
FIG. 9 is a flow chart showing a motor-generator control routine executed by the apparatus.

(Motor-generator Control Routine)

A specific example of control of the motor-generator 440 carried out in the above steps 1108, 1116, 1215 is shown in FIG. 9 as a motor-generator control routine 1500.

The engine speed Ne is inputted (step 1501), and the flag fac is checked (step 1502). If the flag fac is 0, i.e., if operation of the air-conditioner compressor 450 is not demanded, a target speed Nmp of the motor-generator 440 is set to the engine speed Ne (step 1503). If the flag fac is 1, i.e., if operation of the air-conditioner compressor 450 is demanded, the target speed Nmp of the motor-generator 440 is set to the engine speed Ne/(1+ρ). ρ is a constant which represents a planetary gear ratio, and set to a value such that when the speed of the motor-generator 440, i.e., the speed Nm of the first shaft 421 is 1/(1+ρ) of the engine speed, i.e., the speed Ne of the second shaft 422. The speed of the first shaft 421 of the torque-dividing mechanism 420 becomes equal to the speed of the third shaft 423 of the torque-dividing mechanism 420.

Next, feedback control is carried out until the speed of the motor-generator 440 reaches the target speed Nmp (steps 1505, 1506), and then processing returns to the main routine.

If this is done, the speed of the second shaft 422 becomes 0 as a result of step 1503, and the locking of the lock mechanism 460 (steps 1117, 1218) can be carried out without shock. As a result of step 1504, the speed of the second shaft 422 becomes equal to the speed of the third shaft 423. The engagement of the clutch mechanism 430 (steps 1109, 1221) can be carried out without shock.

Preferably, control of the motor-generator 440 carried out for state changes of the clutch mechanism 430 and the lock mechanism 460 described above is carried out gradually over a predetermined time, to reduce shock caused by sudden changes in generated torque or load torque of the motor-generator 440.

In the above embodiment, the clutch mechanism 430 is in the engaging condition and in the engaging condition to engage and disengage the first shaft 421 and the third shaft 423 of the torque-dividing mechanism 420, respectively. Alternatively it may be in the engaging condition and in the engaging condition to engage and disengage for example the first shaft 421 and the second shaft 422, respectively.

What is claimed is:

1. A functional combined equipment for a motor vehicle comprising:

a torque-dividing mechanism having three shafts individually connected to an engine which is stopped at idle time, a motor-generator and an accessory device, for transmitting torque inputted to a predetermined shaft to remaining shafts among the three shafts;

a lock mechanism for locking the shaft connected to the accessory device;

a clutch mechanism for mechanically linking two shafts among the three shafts of the torque-dividing mechanism; and a control unit for controlling a torque transfer relationship between the engine or the motor-generator as torque-producing means and the engine or the motor-generator or the accessory device as torque-loading means by changing states of the clutch mechanism and the lock mechanism, wherein the control unit controls, before a change of the state of the clutch mechanism or the lock mechanism, a state of the motor-generator to effect a state change of the torque-dividing mechanism in a predetermined direction such that a shock caused by the state change of the clutch mechanism or the lock mechanism is moderated.

2. A functional combined equipment for a motor vehicle according to claim 1, wherein the control unit has:

a starter mode, in which the clutch mechanism is in the engaging condition, the lock mechanism is in the locking condition and the engine is started by the motor-generator;

an electric compressor mode, in which the clutch mechanism is in the engaging condition, the lock mechanism is in the unlocking condition and an air-conditioner compressor constituting the accessory device is electrically driven by the motor-generator;

a first normal mode, in which the clutch mechanism is in the engaging condition, the lock mechanism is in the unlocking condition and both the motor-generator and the air-conditioner compressor are driven by the engine; and a second normal mode, in which the clutch mechanism is in the engaging condition, the lock mechanism is in the locking condition and the air-conditioner compressor is not driven by the engine, although the motor-generator is driven by the engine.

3. A functional combined equipment for a motor vehicle according to claim 2, wherein the control unit effects the state change of the torque-dividing mechanism in the predetermined direction such that the shock is moderated by adjusting the speed of the motor-generator, with the clutch mechanism and the lock mechanism released, before a state change of the clutch mechanism and the lock mechanism.

4. A functional combined equipment for a motor vehicle according to claim 3, wherein the control unit calculates a target speed of the motor-generator such that the shock can be moderated on the basis of an inputted engine speed and speed ratios of the shafts of the torque-dividing mechanism and brings the motor-generator to the target speed before effecting a state change of a predetermined state of the clutch mechanism and the lock mechanism.

5. A functional combined equipment for a motor vehicle according to claim 4, wherein the control unit brings a speed difference between the two shafts of the clutch mechanism to below a predetermined value by speed control of the motor-generator toward the target speed before releasing the lock mechanism and engaging the clutch mechanism.

6. A functional combined equipment for a motor vehicle according to claim 4, wherein the control unit brings a speed difference between the two shafts of the lock mechanism to below a predetermined value by speed control of the motor-generator toward the target speed before releasing the clutch mechanism and locking the lock mechanism.

7. A functional combined equipment for a motor vehicle according to claim 5, wherein the control unit executes speed control of the motor-generator for a predetermined time.

8. A functional combined equipment for a motor vehicle according to claim 4, wherein the control unit cuts off a generated torque of the motor-generator before executing a release of the clutch mechanism or the lock mechanism.

9. A functional combined equipment for a motor vehicle according to claim 1, wherein the torque-dividing mechanism includes a planetary gear mechanism.

* * * * *